Sept. 6, 1927.  
E. P. HANNIG  
1,641,167  
LIGHT AND CONTROL THEREFOR  
Filed July 13, 1921  4 Sheets-Sheet 4
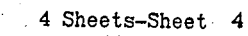
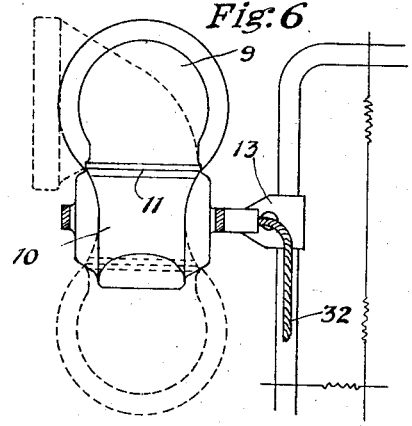
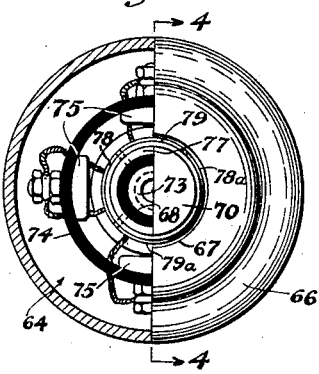
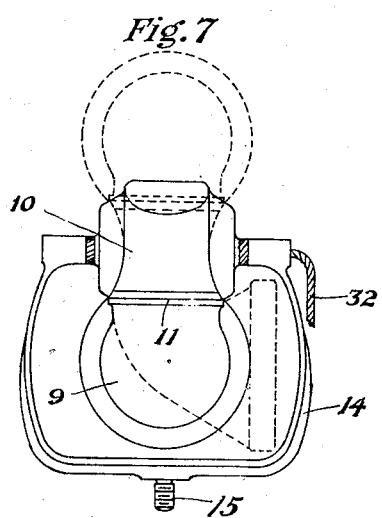
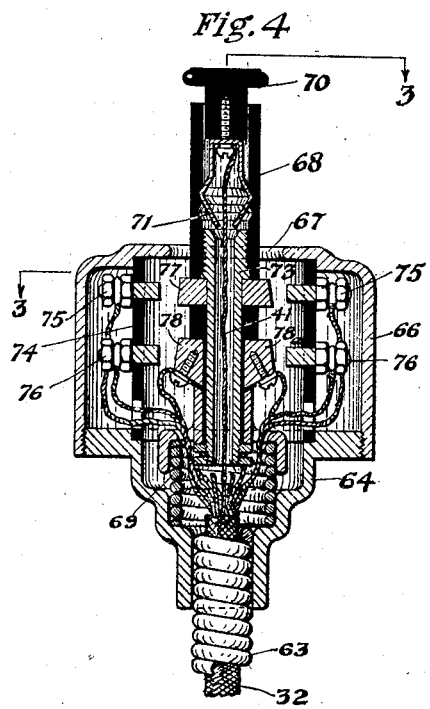
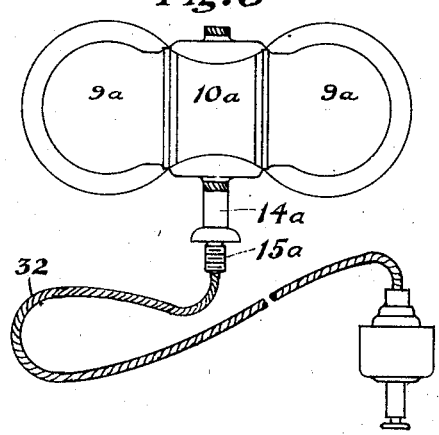
INVENTOR  
Edward P. Hannig  
BY  
Miller Chindohl Parker  
ATTORNEYS Patented Sept. 6, 1927.

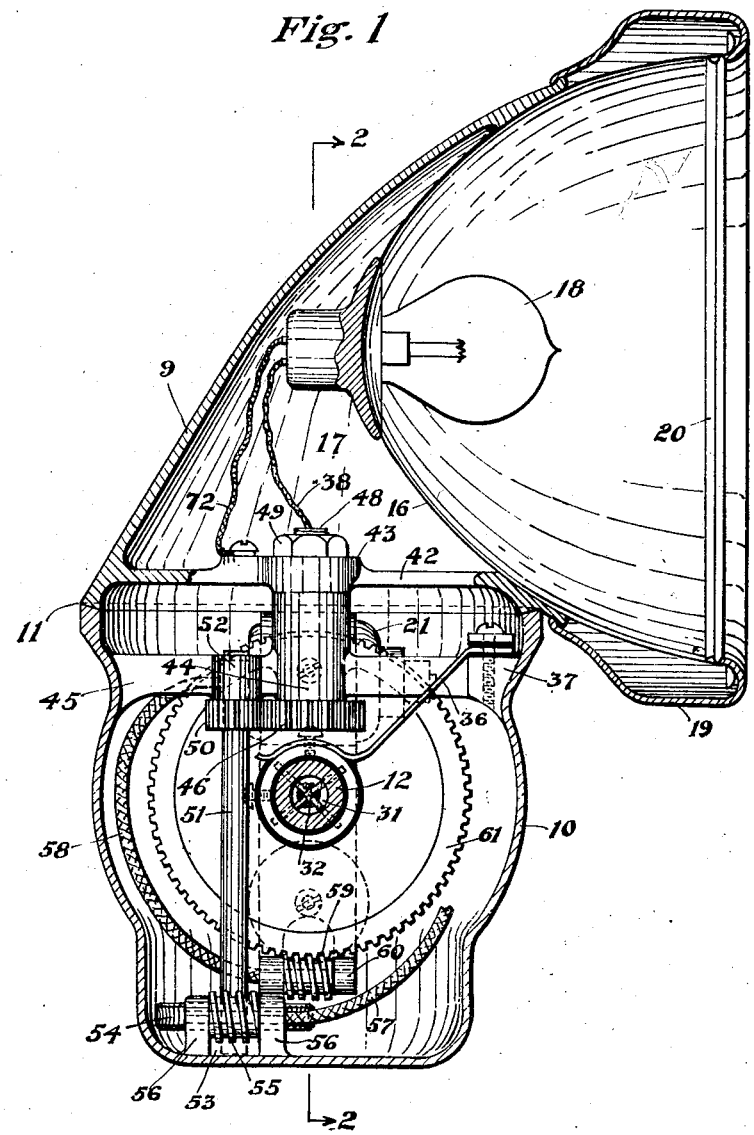

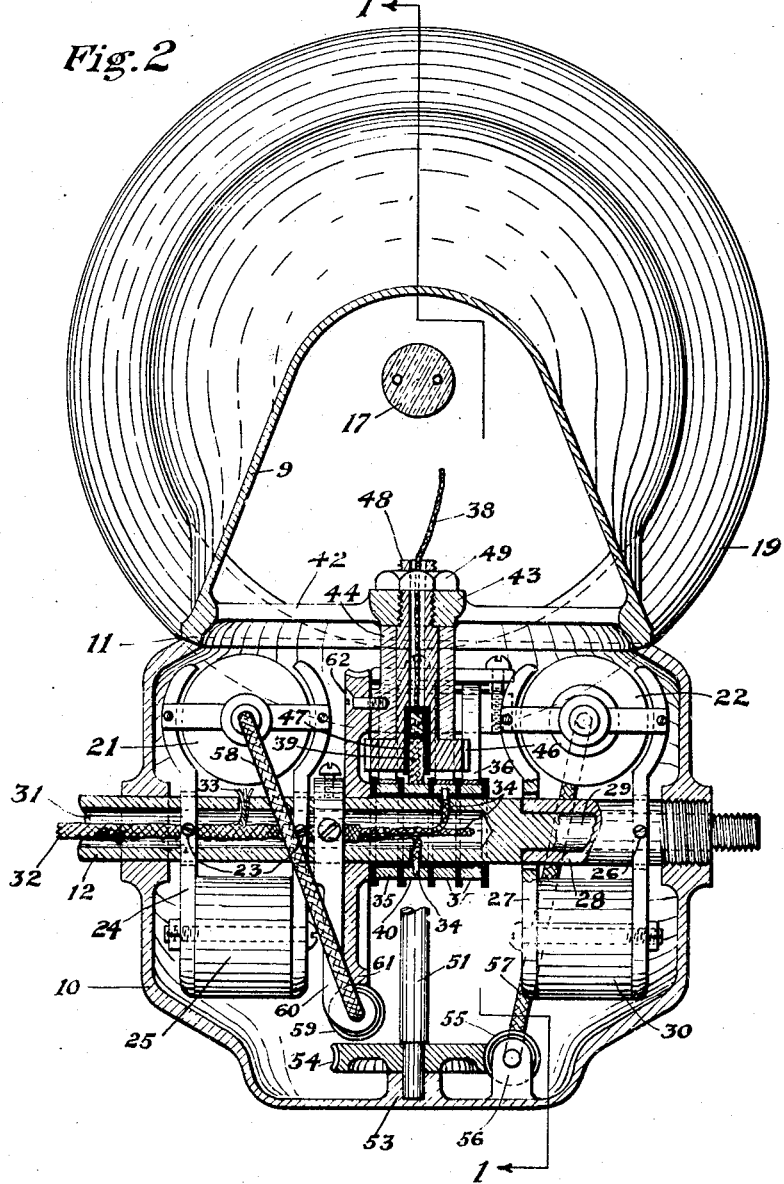

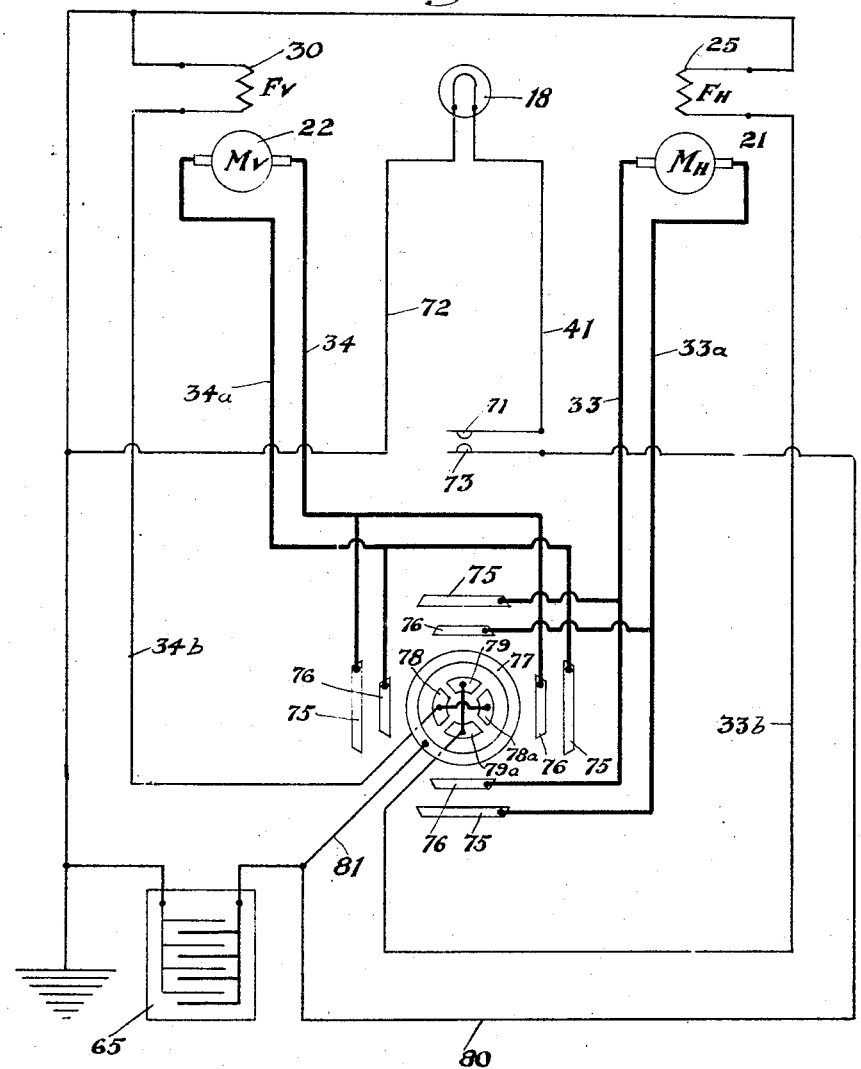

1,641,167

UNITED STATES PATENT OFFICE.

EDWARD P. HANNIG, OF CHICAGO, ILLINOIS.

LIGHT AND CONTROL THEREFOR.

Application filed July 13, 1921. Serial No. 484,275.

My invention relates to an improved light capable of universal adjustment and especially adapted for use in connection with automobiles, launches and the like as a spotlight or searchlight.

One object of the invention consists in providing a light of this kind which is compact in construction and may be mounted on the windshield or radiator of an automobile or the prow of a boat and controlled from some remote point to train the light quickly upon any object or vicinity with considerable precision.

Another object is to provide in connection with the light a novel form of controller peculiarly adapted to the mode of operation of the light by means of which the light can be projected in any direction by moving the controller lever in the same manner as if the light itself were mechanically connected for manual operation to the end of the lever.

Other advantages of the invention will be pointed out as the following description progresses, in which reference is made to the accompanying drawings wherein Figure 1 is a central vertical cross-section of a light constructed in accordance with this invention, the view being taken on line 1—1 of Fig. 2. Fig. 2 is a transverse section taken at right angles to Fig. 1 and on line 2—2 thereof. Fig. 3 is a plan view partly in section of the controller forming a part of this invention, the part in section being taken on line 3—3 of Fig. 4. Fig. 4 is a central longitudinal section taken on line 4—4 of Fig. 3. Fig. 5 is a wiring diagram showing in a diagrammatic way the electrical circuit including the light and the controller. Figs. 6 and 7 are rear elevations of two forms of the invention, and Fig. 8 is a similar view of a modification of the invention.

Throughout the views, the same reference numerals are applied to the same parts.

Referring to the drawings, and especially Figs. 1 and 2, the light is made up of two sections, the head section 9 and the body or base section 10. The head 9 is revoluble on the body 10 by virtue of a swivel connection provided at the neck 11. The body 10 is arranged to rotate about a central shaft 12 which projects through the body from side to side and may be journaled in a bracket 13, shown in Fig. 6 as mounted upon the frame of the windshield of an automobile or, if desired, the light may be pivotally supported in a U-shaped bracket or standard 14 as illustrated in Fig. 7, the bracket having a threaded stud 15 for mounting the light on the radiator cap of an automobile or upon the prow of a boat.

Within the head 9 is mounted a reflector 16 which carries a lamp socket 17 for the lamp 18. A rim 19, preferably of spun sheet metal, is fitted snugly to the forward edge of the head 9 and holds the reflector 16 in position. The lens 20 of the usual form is mounted in the reflector in front of the lamp 18. The head sets squattily upon the body section as shown in order to effect greater compactness.

Two reversible motors 21 and 22 or any other desired form of motive means are mounted in the body 10 at its opposite side walls. In the present instance because the motor 21 is reversible it serves to rotate the body 10 with the head 9 about the shaft 12 in either direction. The motor 21 is fastened to the shaft by set screws 23 which are received in threaded openings in the pole pieces 24 of the motor. These pole pieces straddle the shaft 12 and support between them the field coil 25 for the motor 21. The shaft 12 is made of brass or some other material having low permeability. This is to avoid possible propagation of the magnetic lines from the pole pieces of the motor which would result in a weakening of the magnetic field.

The motor 22 being likewise reversible is adapted when operated to revolve the head 9 on the body 10 in either direction. It is connected similarly to the motor 21 by set screws 26 which pass through the pole pieces 27 and engage a collar 28 on the reduced portion 29 of the shaft 12. The field coil 30 is carried similarly to the coil 25 below the shaft 12. The collar 28, which is made of the same material as the shaft 12, threads tightly into the wall of the body 10 so that the motor 22 is movable with the body 10 about the shaft 12 and relatively to the motor 21 which is stationary with the shaft.

The shaft 12 is counterbored as at 31 substantially to the reduced portion 29 and receives a flexible conduit 32 in which are wires 33 and 34 leading to the motors 21 and 22, respectively. The wires 34 terminate at three slip rings 35 with which engage collector brushes 36 having electrical connection with the motor 22. These brushes are permanently secured on a ledge 37 on the front wall of the body 10 and serve to maintain constant electrical connection between the slip rings 35 and the motor 22.

The lamp 18 has a wire 38 terminating in a spring-pressed brush 39 which slidably engages a slip ring 40. This ring is connected to a wire 41 also contained within the conduit 32. The lamp 18 is thus supplied with current no matter to what position the body 10 is moved with respect to the shaft 12.

The three wires 33 for the motor 21 and the slip rings 35 for the motor 22 are so connected that the motors may be caused to turn in either direction as the occasion demands. Both motors are preferably series wound to afford maximum starting torque which, of course, is essential here particularly where the motors must have considerable pick-up to respond properly to the sudden starting and reversing under load. The brushes of the motors are for simplicity arranged on a central axis and are not given a lead in either direction so that the motors respond equally to current flowing in either direction. Although I prefer to supply the current to these motors and to the lamp 18 from the storage battery of the automobile, this provision may be made in any other manner found feasible in practice.

Means is provided to fix the head relatively to the body, and said means is preferably used to impart the rotary motion. The head 9 has a spider 42 cast integrally therein with a central hub 43 which registers with an elongated hub 44 carried centrally in an integrally cast web 45 in the body portion 10. A gear 46 lying against the nether side of the hub 44 has a socket in which is received a cup 47 of insulating material. Within this cup is reciprocably mounted the brush 39 for the lamp 18. Projecting centrally from the gear 46 and formed preferably integral therewith is a hollow stem 48 which serves as a journal piece for the head 9 and receives the wire 38 leading from the brush 39 to the lamp 18. This stem is threaded at its outer end and received in a threaded opening in the hub 43. A nut 49 on the end of the stem locks the stem securely against relative rotation with respect to the head 9. Meshing with the gear 46 is a pinion 50 mounted on the upper end of a spindle 51 supported in bearings 52 and 53 in the web 45 and the bottom of the body portion 10 respectively. A worm gear 54 is keyed to the lower end of the stem 51 and meshes with a worm 55 rotatably mounted in bearing lugs 56 cast preferably in the bottom of the body portion 10. A flexible drive shaft 57 is coupled to the worm 55 and is connected at its free end with the armature shaft of the motor 22 to be driven thereby. It will be seen that when the motor 22 is operated, the head 9 is revolved on the base 10 through a train of gears including the gear 46, pinion 50, worm gear 54 and worm 55.

The motor 21 has a similar flexible drive shaft 58 connected to its armature shaft and coupled to a worm 59 rotatably mounted in a bracket 60 secured rigidly upon the shaft 12. The worm 59 meshes with a worm gear 61 free to rotate with respect to the shaft 12. The worm gear 61 is fastened by a screw 62 to the hub 44 as shown in Fig. 2. When the motor 31 is operated, the body 10 is caused to rotate about the shaft 12 as an axis in an obvious manner.

In Fig. 8 I have illustrated a practical modification of the invention wherein two head sections 9ª are arranged to revolve upon a common body 10ª. These head sections will be operated simultaneously from a common spindle in the form of an extension of the spindle 51, the body 10ª being operated similarly to the body 10. A standard 14ª having a threaded stud 15ª serves as a means of support for the light whereby it may be mounted upon the radiator cap of an automobile or upon the prow of a boat.

Referring now to Figs. 3 and 4 wherein is illustrated the controller forming a part of the present invention, the conduit 32 is shown enclosed in a flexible metal sheathing 63, known commercially as BX. The sheathing 63 is permanently soldered in a neck portion projecting from the plate 64. The conduit 32 carries wires leading from the battery 65 represented diagrammatically in Fig. 5, in addition to the wires 33, 34 and 41 which are connected to the motors 21 and 22 and the lamp 18 respectively. It is the purpose of the controller to associate the wires in proper desired relations to communicate certain movements to the light, either to the head or the body portion separately or both simultaneously and in either direction, and also of course to control the lamp 18. A cylindrical cap 66 is threaded upon the plate 64 and has a central opening 67 in its outer end in which is movable a controller lever 68, the upper portion of which is preferably of insulating material as shown in Fig. 4. The controller lever is mounted for universal movement with respect to the plate 64 on a closely coiled spring 69 permanently mounted in the plate 64. A switch push button 70 for controlling the light 18 is preferably mounted in the free end of the controller lever 68 which is hollow as shown and has two annular grooves in either one of which is received spring tongues 71 fastened to the nether side of the button 70. The wire 41 previously referred to as connected to the slip ring 40, terminates at the spring tongues 71 as shown. The opposite terminal of the lamp 18 is grounded as shown in Fig. 1 by a wire 72 permanently connected to the spider 42. When the button 70 is depressed the spring tongues 71 ride out of the outer annular groove into an inner groove and contact with a hollow stem 73 thereby completing the circuit for the lamp 18.

Mounted in concentric relation to the lever 68 inside the cap 66 is a tube 74 of insulating material in which are fastened a set of contacts 75 disposed 90° apart as shown in Fig. 3. These contacts will hereinafter be referred to as the "outer" contacts. A second set of contacts 76 are mounted in the tube below the contact 75 and in similarly spaced relation. These contacts will hereinafter be referred to as the "inner" contacts. A contact ring 77 on the stem 73 is adapted to engage any one of the contacts 75 or two adjacent contacts when the lever 68 is properly deflected. Below the ring 77 are four segments insulated from each other and from the stem 73, segments 78 and 78$^a$ being common and segments 79 and 79$^a$ common with reference to their electrical connections.

In describing the manner of operating the light, reference will be made to the wiring diagram in Fig. 5. Before proceeding with the description it may be noted that it is found advantageous to mount the controller in a horizontal plane upon the instrument board or some similar place in the tonneau of the automobile where it may be easily reached by the driver or his companion. The controller has connections with the motors 21 and 22 in such a manner that the operator, by simply deflecting the lever the same as he would if the light itself were fastened mechanically to the end of the lever for manual operation, can project the light in any direction at will. In other words, it is not necessary for him to keep in mind any special method of procedure but simply by noting the direction in which the light is then projecting or from a knowledge of the direction in which he wishes to project the light, the operator can mechanically and without any mental calculation move the lever in the proper direction to effect the desired projection of the light. Assuming, for example, that it is desired to project the light off of the road ahead to the right of the road to illuminate a sign or automobile guide mark, the operator will mechanically move the controller lever over to the left the same as he would if the light were carried on the free end of the lever and mounted for manual operation. This is assuming, of course, that the driver has depressed the button 70 to light the lamp 18 so that, referring to Fig. 5, the following circuit is completed: From one terminal of the battery 65 through the conductor 80, contacts 73 and 71, conductor 41, lamp 18, conductor 72 to ground and thence to the other terminal of the battery 65.

When the operator has moved the lever to the left, as above mentioned, he causes engagement with the left bank of contacts in the controller. The ring 77 engages the left outer contact 75 and the segment 78 engages the left inner contact 76 thereby completing the following circuit, including the motor 22: From one terminal of the battery 65 through conductor 81, ring 77, left outer contact 75, conductor 34, through the armature of the motor 22, conductor 34$^a$, left inner contact 76, segment 78, conductor 34$^b$, through the field coil 30 to ground and thence to the opposite terminal of the battery 65. The motor 22 is thereby caused to operate to revolve the head 9 on the body 10 to project the light to the right of the road. Assume now that the lever has been held by the operator against the left bank of contacts for too long an interval so that the shaft of light has passed the proper point or that it is necessary to revert the light to the road ahead or perhaps even to the left of the road. Under these circumstances, the operator will move the lever over to the right bank of contacts. This causes a reversal of the current flowing through the armature of the motor 22 thereby revolving the head 9 on the body 10 in a direction opposite to its former movement. The circuit completed is as follows: From one terminal of the battery 65 through the conductor 81, ring 77, right outer contact 75, conductor 34$^a$, through the armature of the motor 22, conductor 34 to the right inner contact 76, segment 78$^a$, conductor 34$^b$, through the field coil 30 to ground, and thence to the opposite terminal of the battery 65.

If the light is being projected too low and the operator desires to project it upwardly somewhat he may do so by moving the controller lever downwardly just as he would naturally and without mental calculation move it if the lamp were fastened mechanically to the end of the lever for manual operation. It will be remembered that the motor 22 is still being operated because of the continued engagement of the controller lever with the right bank of contacts. The deflection of the lever to deflect the light rays upwardly necessitates moving the lever down so that the ring 77 and the segment 79$^a$ engage the right bank of contacts and the lower bank of contacts so that in addition to the circuit last above described a second and parallel circuit is completed as follows: From one terminal of the battery 65 through conductor 81, ring 77, lower outer contact 75, conductor 33$^a$, through the armature of the motor 21, conductor 33 to the lower inner contact 76, segment 79ª, conductor 33ᵇ, through the field coil 25 of the motor 21 to ground and thence to the other terminal of the battery 65. Both motors 21 and 22 are thereby operated simultaneously and the light is projected diagonally upwardly to the left. If the light is projected too high or it is desired to return the light to the normal horizontal level, the lever 68 will be moved upwardly to cause a reversal of the current through the motor 21. When this motor operates, it of course causes the body 10 to rotate together with its head portion 9 as a unit about the shaft 12.

It will appear that one of the distinct advantages of the controller aside from the fact that by it the operator is enabled to manipulate the light by precisely the same movements of the lever which would be required if the light were fastened mechanically to the end of the lever for manual operation, is that the movement of the lever necessary to return the light to its initial position is exactly opposite to that which caused the light to move to the position which the light is then in. For example, assuming that the light has been projected to the right and down, it may be restored to its initial position or returned partway to its initial position by moving the lever diagonally to the upper left hand side of the opening 67 in the controller. This is especially advantageous in the operation of training the light upon some certain object when the operator is likely to hold the lever in operative position too long so that the light passes the desired point. When the light is left projecting in a certain direction and it becomes necessary or desirable to restore it to its normal projection forwardly and onto the road, the operator will grasp the lever to move it from its central position where, it will be remembered, it always moves under the action of its spring 69. The lever is then moved in a direction to cause the light to move to the right, if, for example, it is at the moment projecting to the left.

It will be observed from the foregoing description that the invention provides a novel and very practical accessory of this character which is comparatively simple in construction and may be manufactured economically. Although the embodiment herein shown has been described as the preferred form of the invention, it is apparent that the same is capable of considerable modification in its structural features without, however, departing materially from the spirit and scope of the invention as defined by the following claims.

I claim as my invention:

1. In a light of the character described, the combination of a casing, a bracket for supporting the same, said casing comprising a body section pivotally supported by said bracket to turn on its horizontal axis, a lamp carrying head section having swivel connection with said body to revolve on said body on its vertical axis, a motor carried on a part fixed with respect to said body to turn the head section, a second motor adapted to turn the body section relative to said bracket, said motor being carried by one of said relatively moving parts, and means to control said motors comprising two banks of contacts for each of said motors, one of said banks affording connections for one of said motors to drive the same in one direction and the other affording connections to drive said motor in the opposite direction, said banks being disposed concentrically with the banks of each motor in diametrically opposed relation, a control lever disposed centrally between said contacts in floating relation, spring means normally holding the same in central position, said lever being adapted when moved into engagement with one bank of said contacts to close an electrical circuit through one of said motors and being adapted to be moved diagonally between two of said banks to close electrical circuits simultaneously through both of said motors, said contacts being disposed with relation to said lever, so that said motors are operated to move said lamp responsive to the same movements of the lever which would be required to produce corresponding movements of the lamp if said lamp itself were mechanically connected to the end of the lever for manual operation.

2. In a light of the character described, the combination of a casing, a bracket for supporting the same, said casing comprising a body section pivotally supported by said bracket to turn on its horizontal axis, a lamp carrying head section having a swivel connection with said body to revolve on said body on its vertical axis, a motor carried on a part fixed with respect to said body to turn the head section, a second motor adapted to turn the body section relative to said bracket, said motor being carried by one of said relatively moving parts, and means to control said motors comprising two banks of contacts for each of said motors, one of said banks affording connections for one of said motors to drive the same in one direction and the other affording connections to drive said motor in the opposite direction, said banks being disposed with the banks of each motor in opposed relation, a control lever disposed between said contacts, said lever being adapted when moved into engagement with one bank of said contacts to close an electrical circuit through one of said motors and being adapted to be moved diagonally between two of said banks to close electrical circuits simultaneously through both of said motors, 3. In a light of the character described, the combination of a casing, a bracket for supporting the same, said casing comprising a body section pivotally supported by said bracket, a lamp carrying head section having swivel connection with said body, a motor fixed with respect to said body to turn the head section, a second motor adapted to turn said body section relative to said bracket, said motor being fixed with respect to one of said parts, and means to control said motors comprising, a control lever, two banks of contacts arranged circularly about the lever for each of said motors, one of said banks affording connections for one of said motors to drive the same in one direction and the other affording connections to drive said motor in the opposite direction, said lever being adapted to contact a single bank for operation of one motor and to contact adjacent banks simultaneously for the operation of both motors.

4. A universally adjustable light comprising a body section, a central stationary shaft providing a pivotal support therefor, a head section, a stem secured thereto and pivotally mounted in said body section whereby said head section is revoluble on said body section, means for driving said head section, comprising a motor, a collar part rotatable on said central shaft fixed with respect to said body section and adapted to support said motor, a gear on said stem and transmission gearing between said gear and said motor, means for driving said body section comprising a motor fixed on said central shaft, a gear fixed to said body section, and transmission gearing between said gear and said last mentioned motor, and means for controlling the operation of said motors, said means being adapted to operate said motors either separately or together.

5. An adjustable light comprising a body section, a central stationary shaft providing a pivotal support therefor, a head section, a stem secured thereto and pivotally mounted in said body section whereby said head section is revoluble on said base section, means for driving said head section, comprising a motor, a gear on said stem and transmission gearing between said gear and said motor, means for driving said body section comprising a motor, a gear fixed to said body section, transmission gearing between said gear and said last mentioned motor, and means for controlling the operation of said motors.

6. A remote control device for a universally adjustable electric light having a pair of driving units, one of said units when operated being adapted to move said light about a vertical axis and the other of said units when operated being adapted to move said light about a horizontal axis, comprising a universally movable control lever having connection with a source of electrical energy, a switch on said lever arranged to control the communication of current to said light, and four banks of contacts disposed concentrically and in equally spaced relation about said lever, two of said banks being connected to each of said driving units, one of said banks for a unit being adapted to close connections whereby to operate the same in one direction and the other of said banks therefor being oppositely disposed and adapted to close connections whereby to operate said unit in the opposite direction, said lever being adapted to be selectively engaged with said banks of contacts to cause said driving units to operate in either direction separately or together.

7. An adjustable light comprising a body section, a head section, a lamp therein, a tubular swivel piece between said sections, a rigid bracket on which said body section may be continuously revolved, a slip ring on said bracket, a brush in said tube connected with the lamp in said head section engaging said slip ring to provide a constant electrical connection for said lamp in the various positions of said head with reference to said body and of said body with respect to said bracket, and means for turning said head and said body.

8. An adjustable light comprising a body section, a lamp-carrying head rotatable continuously on said body section, a journal therefor in said body section, a rigid support for said body section having the same continuously rotatable thereon, an electromotive device stationary with respect to said support to turn said body section thereon and having a mechanical drive connection therewith, an electromotive device stationary with respect to said body section having a mechanical drive connection with said head to turn the same, a slip ring on said support, and a brush engaging the same providing a constant electrical connection for said last mentioned electromotive device.

9. An adjustable light comprising a body section, a head section rotatable continuously on said body section, a lamp in said head section, a hollow journal for said head section, a rigid support for said body section having the same continuously rotatable thereon, a slip ring on said support, a brush engaging the same having a connection extending through said journal to the lamp in said head section providing a constant electrical connection for said lamp in the various positions to which said head moves with respect to said body and to which said body moves with respect to said support, an electromotive device stationary with respect to said support to turn said body section thereon and having a mechanical drive connection therewith, another electromotive device stationary with reference to said body section and having a mechanical drive connection with said head to turn the same, another slip ring on said support, and a brush engaging the same providing a constant electrical connection for said last mentioned electromotive device.

10. An adjustable light comprising a hollow body section, a stationary shaft providing a support upon which the section may revolve, a lamp-carrying head section, a journal therefor extending into the body section to provide a swivel connection with the latter, an electromotive device in said body section for driving said head section having a mechanical drive connection with said journal, another electromotive device in said body section for driving the same with respect to said supporting shaft, and means to control said electromotive devices so that both are made to operate together or either of them selectively or separately in either direction or together in the same direction or in opposite directions.

11. An adjustable light comprising a hollow body section, a stationary shaft providing a support upon which the section may revolve, a lamp-carrying head section, a journal therefor extending into the body section to provide a swivel connection with the latter, an electromotive device in said body section for driving said head section having a mechanical drive connection with said journal, another electromotive device in said body section fixed with respect to said shaft for driving the body section, said device having a mechanical drive connection with said body section and a remote control for said devices.

12. An adjustable light comprising, a body section, a stationary shaft providing a pivotal support therefor, a head section, a stem secured thereto and pivotally mounted in said body section whereby said head section is revoluble on said body section, motive means for driving said head section including a gear on said stem and transmission gearing between said gear and said motive means, other motive means in the body section for driving said body section including a gear fixed to said body section, transmission gearing between said gear and said last mentioned motive means, and means for controlling the operation of said motive means.

13. In a device of the character described, a body section of an approximately cylindrical form, a shaft extending horizontally therethrough approximately centrally and transversely to the longitudinal axis of said body section providing a support on which the same is arranged to be revolved horizontally continuously in either direction, a lamp-carrying head section swivelly connected to said body section to revolve thereon continuously in either direction and set squattily on said body section with the light opening portion thereof overlying the side of said body section but avoiding engagement with said shaft in any position to which said head section is adjusted with reference to said body section.

14. In a device of the character described, a body section of an approximately cylindrical form, a shaft extending horizontally therethrough, approximately centrally and transversely to the longitudinal axis of said body section providing a support on which the same is arranged to be revolved horizontally continuously in either direction, a lamp-carrying head section swivelly connected to said body section to revolve thereon continuously in either direction and set squattily on said body section with the light opening portion thereof overlying the side of said body section but avoiding engagement with said shaft in any position to which said head section is adjusted with reference to said body section, the connection between said sections and the shaft supporting said body section being arranged to avoid obstruction to the light projected from the lamp in the head section in any position to which the latter is adjusted with reference to the body section or to which the body section is adjusted.

15. In a device of the character described, a body section, a shaft extending therethrough providing a support therefor, a head section, a centrally arranged swivel bearing in said body section, a journal rigid with said head section extending into said bearing transversely to said shaft, a motive device on said shaft on one side of said bearing, a part rigid with said bearing providing a mechanical connection between said device and said body section to turn said body section about said shaft, another motive device supported on said body section on the opposite side of said bearing, and a part rigid with said journal providing a mechanical connection between said last mentioned device and said head section to turn the latter on said body section.

16. In a device of the character described, a body section, a hollow shaft extending therethrough to support the same, a head section swivelly mounted on said body section, an electromotive device rigid with said shaft and arranged to turn said body section about the shaft, a sleeve on said shaft rigid with said body section, another electromotive device carried by said sleeve and arranged to revolve with said body section in its movement about said shaft and having a connection with said head section to turn the same with reference to said body section, slip ring on said shaft, conductor wires leading in through said shaft having connection with said rings, and brushes engaging said rings providing constant electrical connection for said last mentioned electromotive device in any position to which said body section and said device is revolved with reference to said shaft.

17. In a device of the character described, a body section, a hollow shaft extending therethrough providing a support therefor, a lamp-carrying head section having a hollow journal providing a swivel connection with said body section, an electromotive device carried by said shaft and having connections with said body section to revolve the same about said shaft, a sleeve on said shaft rigid with said body section, another electromotive device carried on said sleeve and having connections with said head section to turn the same with reference to said body section, slip rings on said shaft, conductor wires leading in through said shaft connected to said rings, a brush in said journal engaging one of said rings to provide constant electrical connection for said lamp in any position to which the head section is revolved with respect to the body section or to which the body section is turned on the shaft, and other brushes engaging the other slip rings providing a constant electrical connection for the last mentioned electromotive device in any position to which the body section is revolved on said shaft.

18. In a device of the character described, a body section, a shaft extending horizontally therethrough providing a support on which said body section may be revolved, a head section having a journal rigid therewith, a bearing provided in said body section to receive said journal to permit swivel movement of said head section on said body section, gearing for driving said journal to revolve said head section, a gear rigid with said body section for turning the same on said shaft, worms meshing with said gears for driving the same, and drive motors oppositely disposed in said body section having flexible shafts connecting the same with said worms to drive the latter.

In testimony whereof, I have hereunto set my hand.

EDWARD P. HANNIG.